US012706669B2

(12) United States Patent
Aguirre et al.

(10) Patent No.: US 12,706,669 B2
(45) Date of Patent: Aug. 11, 2026

(54) FAILURE DETECTION METHOD INTEGRATED IN OPTICAL AMPLIFIERS AND REMOTE OPTICAL TRANSMITTERS FOR RADIO FREQUENCY ON GLASS (RFOG) AND DISTRIBUTED ACCESS ARCHITECTURE (DAA) CABLE TELEVISION (CATV) NETWORKS

(71) Applicant: ARRIS Enterprises LLC, Suwanee, GA (US)

(72) Inventors: Sergio Alfredo Mendoza Aguirre, Apodaca (MX); Jose A. Torres Zugaide, Monterrey (MX); Emilio Rodriquez Dominguez, Apodaca (MX)

(73) Assignee: ARRIS Enterprises LLC, Horsham, PA (US)

( * ) Notice: Subject to any disclaimer, the term of this patent is extended or adjusted under 35 U.S.C. 154(b) by 0 days.

(21) Appl. No.: 17/724,315

(22) Filed: Apr. 19, 2022

(65) Prior Publication Data

US 2022/0337313 A1 Oct. 20, 2022

Related U.S. Application Data

(60) Provisional application No. 63/177,225, filed on Apr. 20, 2021.

(51) Int. Cl.
*H04B 10/079* (2013.01)
*H04B 10/073* (2013.01)

(52) U.S. Cl.
CPC ....... *H04B 10/0791* (2013.01); *H04B 10/073* (2013.01); *H04B 10/07951* (2013.01); *H04B 10/07955* (2013.01)

(58) Field of Classification Search
None
See application file for complete search history.

(56) References Cited

U.S. PATENT DOCUMENTS 4,812,641 A 3/1989 Ortiz, Jr.
5,825,521 A * 10/1998 Ogawa ............ H04B 10/07953 398/81
6,005,694 A 12/1999 Liu
6,396,573 B1 * 5/2002 Pimpinella ........... H04B 10/071 356/73.1

(Continued)

FOREIGN PATENT DOCUMENTS

CN 110635841 A 12/2019

OTHER PUBLICATIONS

Backscattering, Christian Hentschel, Hewlett-Packard Fiber Optics Handbook 33 (1983).*

(Continued)

*Primary Examiner* — David W Lambert
(74) *Attorney, Agent, or Firm* — Chernoff, Vilhauer, McClung & Stenzel, LLP

(57) ABSTRACT

An optical communication fiber link including a monitoring system connected to an optical fiber transmitting electromagnetic radiation including a communication. The monitoring system includes a detection system detecting a scattering of the electromagnetic radiation from the optical fiber. The monitoring system monitors the scattering for an abnormal change and determines, from the abnormal change, an absence or a presence of a fault in the optical fiber.

21 Claims, 16 Drawing Sheets

(56) References Cited

U.S. PATENT DOCUMENTS

| | | | | |
|---|---|---|---|---|
| 6,850,360 | B1 * | 2/2005 | Chen | H01S 3/1312 359/341.33 |
| 9,571,189 | B2 * | 2/2017 | Lin | H04B 10/071 |
| 9,917,637 | B1 * | 3/2018 | Castro Do Amaral | H04B 10/0775 |
| 10,250,323 | B2 | 4/2019 | Von Der Weid et al. | |
| 2012/0224846 | A1 | 9/2012 | Swanson et al. | |
| 2016/0182149 | A1 * | 6/2016 | Domínguez López | H04B 10/0797 398/28 |
| 2016/0191163 | A1 * | 6/2016 | Preston | G01B 11/161 398/16 |

OTHER PUBLICATIONS

Theoretical Stiffness & Theoretical Strength, Chambers Dictionary of Science & Technology 1159 (Peter M. B. Walker ed. 1999).*

International Search Report and Written Opinion RE: Application No. PCT/US22/25418, dated Apr. 19, 2022.

* cited by examiner

FAILURE DETECTION METHOD INTEGRATED IN OPTICAL AMPLIFIERS AND REMOTE OPTICAL TRANSMITTERS FOR RADIO FREQUENCY ON GLASS (RFOG) AND DISTRIBUTED ACCESS ARCHITECTURE (DAA) CABLE TELEVISION (CATV) NETWORKS

BACKGROUND

1. Field

The present document relates to methods and systems for monitoring the health of an optical communication fiber link.

2. Description of the Related Art

FIG. 1 illustrates a point to point (P2P) network 100 connecting a Wide Area Network (WAN) and Community Antenna Television or Cable Television (CATV) to a consumer subscribers 102 using wavelength division multiplexing (WDM). The CATV is connected to a headend 104 comprising a transmitter (Tx) and/or amplifier (erbium doped fiber amplifier, EDFA) and the P2P network comprises a passive optical network (PON) transmitting the television signals (TV) to downstream optical network units (ONUs) at the subscribers 102. The WAN includes an optical line terminal (OLT) and the PON also connects the OLT to the ONUs. In this way, a consumer receives TV, data, and telephone (POTS) over a single PON comprising one or two fibers.

FIG. 2 illustrates a Radio Frequency Over Glass (RFOG) network 200 connecting the CATV to the ONUs. The RFOG network 200 comprises a device 202 converting the digital signal 204 received from the CATV to an RF signal; the transmitter (Tx) comprising a laser outputting an optical signal 208 modulated according to the RF signal, and a tap 206 tapping a portion of the optical signal 208 for digital processing and detection in an alarm system 210. The network 200 further includes the PON comprising an optical link 212 connecting the transmitter (Tx) to the ONUs using a system of single mode optical fibers (SMF) and a 1:n splitter 214. The optical link 212 comprises a first segment L1 before the optical amplifier 216, a second segment (L2) after the optical amplifier 216, and one or more third segments (Lx) after the splitter 214. The optical amplifier 216 compensates for the losses in each of the optical segments L1, L2, Lx and the splitter 214 so that data (e.g., TV) reaches the desired destinations (network units (ONUs) with adequate signal to noise ratio. If a failure (e.g., break in the SMF) occurs in the link L2 after the optical amplifier, it is difficult for conventional methods to determine immediately the physical location of the failure, resulting in network operators spending significant time recovering network functionality. What is needed, then, are improved methods for locating failures in an optical link. The present document satisfies this need.

SUMMARY

To address the requirements described above, this document describes an optical communication fiber link comprising a monitoring system connected to an optical fiber transmitting electromagnetic radiation including a communication. Illustrative, non-exclusive examples of inventive subject matter according to the present document are described in the following examples.

1. The optical communication fiber link wherein monitoring system includes a detection system detecting a scattering of the electromagnetic radiation from the optical fiber. The monitoring system monitors the scattering for an (e.g., abnormal) change; and determines, from the (e.g., abnormal) change, an absence or a presence of a fault in the optical fiber.
2. The optical communication fiber link of example 1, wherein the monitoring system determines a temperature of the optical fiber from the scattering.
3. The optical communication fiber link of example 1 or 2, wherein the monitoring system includes at least one of a circuit or a computer determining the absence or the presence of the fault by comparing the scattering to reference data.
4. The optical communication fiber link of any of the examples 1-3, wherein the reference data comprises at least one of:
   an optical power of the electromagnetic radiation transmitted by the optical fiber, or
   a measurement of a backscattered optical power as a function of a distance along the optical fiber.
5. The optical communication fiber link of any of the examples, wherein the detection system detects the scattering comprising a noisy signal and the monitoring system includes a computer or circuit executing a Kalman filter estimating an actual value for the scattering from the noisy signal.
6. The optical communication fiber link of any of the examples 1-5, wherein:
   the optical communication fiber link includes:
   a transmitter;
   an amplifier; and
   a receiver; wherein:
   the optical fiber comprises a first segment transmitting the electromagnetic radiation from the transmitter to the amplifier and a second segment transmitting the electromagnetic radiation from the amplifier to the receiver, wherein the amplifier amplifies an intensity of the electromagnetic radiation; and
   the detection system includes a photodetector positioned to detect the scattering comprising a backscattering of the electromagnetic radiation from one or more predetermined locations in the second segment or the first segment.
7. The optical communication fiber link of example 6, wherein the transmitter further comprises:
   a laser outputting the electromagnetic radiation; and
   a modulator modulating the laser such that the laser outputs the electromagnetic radiation comprising a pilot signal and the communication distinct from the pilot signal, wherein the monitoring system detects the backscattering by demodulating the pilot signal from the backscattering.
8. The optical communication fiber link of example 7, wherein the monitoring system further comprises:
   a first photodetector positioned to detect the electromagnetic radiation after an output from at least one of the transmitter or the amplifier and output a reference signal in response thereto;
   the photodetector comprising a second photodetector positioned to detect the backscattering from the one or more predetermined locations and output a backscattering signal in response thereto;

a computer or circuit comparing the reference signal and the backscattering signal so as to determine the absence or the presence of the fault.

9. The optical communication fiber link of example 7, wherein the monitoring system further comprises:

a first photodetector positioned to detect the electromagnetic radiation after an output from at least one of the transmitter or the amplifier and output a reference signal in response thereto;

the photodetector comprising a second photodetector positioned to detect the backscattering from the one or more predetermined locations and output a backscattering signal in response thereto;

first circuitry determining, from the reference signal, at least one of a reference amplitude or a reference phase of the pilot signal in the reference signal;

second circuitry determining, from the backscattering signal, at least one of a backscattering amplitude or a backscattering phase of the pilot signal in the backscattering;

a computer or circuit determining the presence or absence of the fault using the reference phase, the reference amplitude, the backscattering phase, and the backscattering amplitude.

10. The optical communication fiber link of example 9, wherein:

the pilot signal comprises a low frequency pilot tone;

the first circuitry comprises a first low pass filter extracting a first band of frequencies including the pilot tone, a first signal conditioner conditioning the first band of frequencies to form a first conditioned band of frequencies, and a de-modulator de-modulating the first conditioned band of frequencies to obtain the reference phase and the reference amplitude of the pilot signal; and the second circuitry comprises a second low pass filter extracting a second band of frequencies including the pilot tone, a second signal conditioner conditioning the second band of frequencies to form a second conditioned band of frequencies, and the de-modulator de-modulating the second conditioned band of frequencies to obtain the backscattering phase and backscattering amplitude of the pilot signal.

11. The optical communication fiber link of example 10, wherein the first photodetector, the second photodetector, the first circuitry, and the second circuitry are integrated with the transmitter or the amplifier.

12. The optical communication fiber link of example 10, wherein:

the backscattering phase and backscattering amplitude comprise noisy signals, the computer or circuit executes a Kalman filter estimating, from the noisy signals, actual values for the backscattering phase and the backscattering amplitude; and the computer or circuit estimates the presence or absence of the fault by comparing the actual values estimated by the Kalman filter with reference data.

13. The optical communication fiber link of example 12, wherein:

the reference data comprises:

a backscattering optical power as a function of a distance along the optical fiber;

transmitted power of the electromagnetic radiation; and the computer or circuit estimates a location of the fault as the distance associated with the actual value of the backscattering amplitude estimated by the Kalman filter taking into account the transmitted power of the electromagnetic radiation.

14. The optical communication fiber link of example 12, wherein the reference data includes a transmitted optical power of the electromagnetic radiation and a distance to the fault is determined by correlating the actual value of the backscattering amplitude with the transmitted output power.

15. The optical communication fiber link of any of the examples 1-14, further comprising a remote node including the detection system and at least one of the transmitter or the amplifier.

16. The optical communication fiber link of example 15, wherein the transmitter comprises an analog transmitter.

17. The optical communication fiber link of any of the examples 1-16, wherein the monitoring system further includes a telemetry interface transmitting, via telemetry, at least one of the scattering, the abnormal change, or a signal associated with the absence or the presence of a fault.

18. The optical communication fiber link of any of the examples 1-17 coupled to a cable television network, wherein the communication comprises television signals used to view television.

19. A method for on-line monitoring of an optical communication fiber link, comprising:

detecting a scattering of electromagnetic radiation from an optical fiber, the electromagnetic radiation transmitting a communication;

monitoring the scattering for an (e.g., abnormal) change; and determining, from the (e.g., abnormal) change, an absence or a presence of a fault in the optical fiber.

20. The method of example 19, wherein the monitoring comprises a computer or circuit determines the presence of absence of the fault by comparing the scattering to reference data.

21. The method of example 19, further comprising determining, from the scattering, a temperature of the optical fiber.

BRIEF DESCRIPTION OF THE DRAWINGS

Referring now to the drawings in which like reference numbers represent corresponding parts throughout.

DESCRIPTION

In the following description, reference is made to the accompanying drawings which form a part hereof, and which is shown, by way of illustration, several embodiments. It is understood that other embodiments may be utilized and structural changes may be made without departing from the scope of the present disclosure.

Overview

The present document describes a system for monitoring an optical communication fiber link The detection system (1) detects a change (e.g., fluctuation) in a scattering of electromagnetic radiation from the optical communication fiber link; and (2) monitors, from the change, a health of the optical communication fiber link. In some examples, monitoring the health includes detecting the presence of a fault in the optical communication fiber link. In one example, a coded signal (e.g., a low frequency tone) is added to the analog data signal transmitted by the transmitter and a circulator is installed in the optical data link so as to measure a backscattering of the optical power comprising the coded signal. In yet further examples, the circulator is located after an optical amplifier and before the splitter in the optical communication fiber link. In yet further examples, an additional photo-detector and signal processing system are included to estimate a distance to the fault.

First Example: Failure Detection System Integrated in an Optical Amplifier

CATV networks are typically characterized by transmission of high optical power. In some examples, the RFOG transmitters output optical signals with a launch optical power (LOP) in a range of 10 to 15 dBm and high power EDFAs output optical power in the range of 14 to 21 dBm. These high optical power levels are possible due to the relatively narrow RF channels (e.g., 6 MHz) and relatively short optical link distances (e.g., maximum of 160 km).

Figure 1:
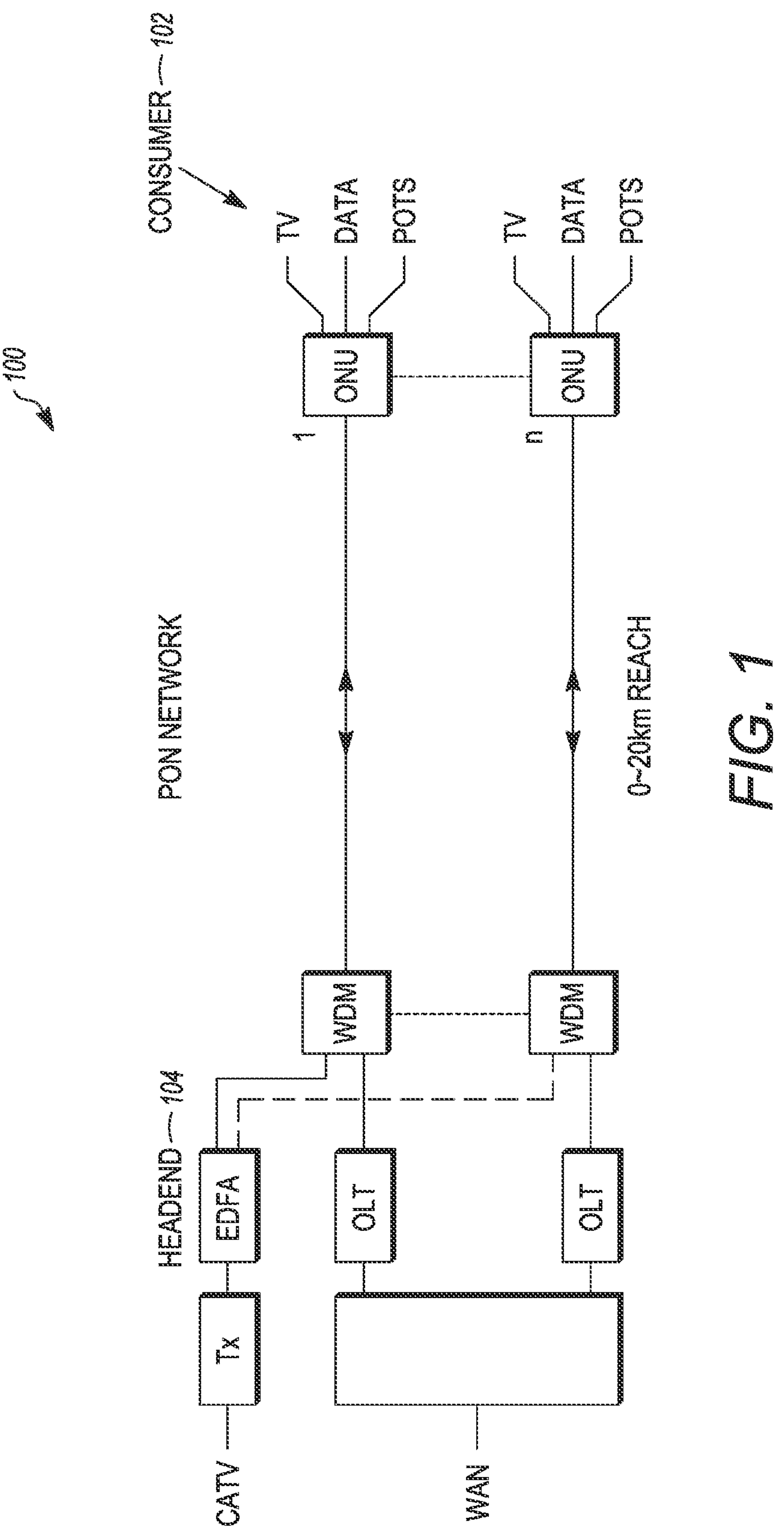
FIG. 1 illustrates an example active Ethernet—Point to Point (P2P) network.
Figure 2:
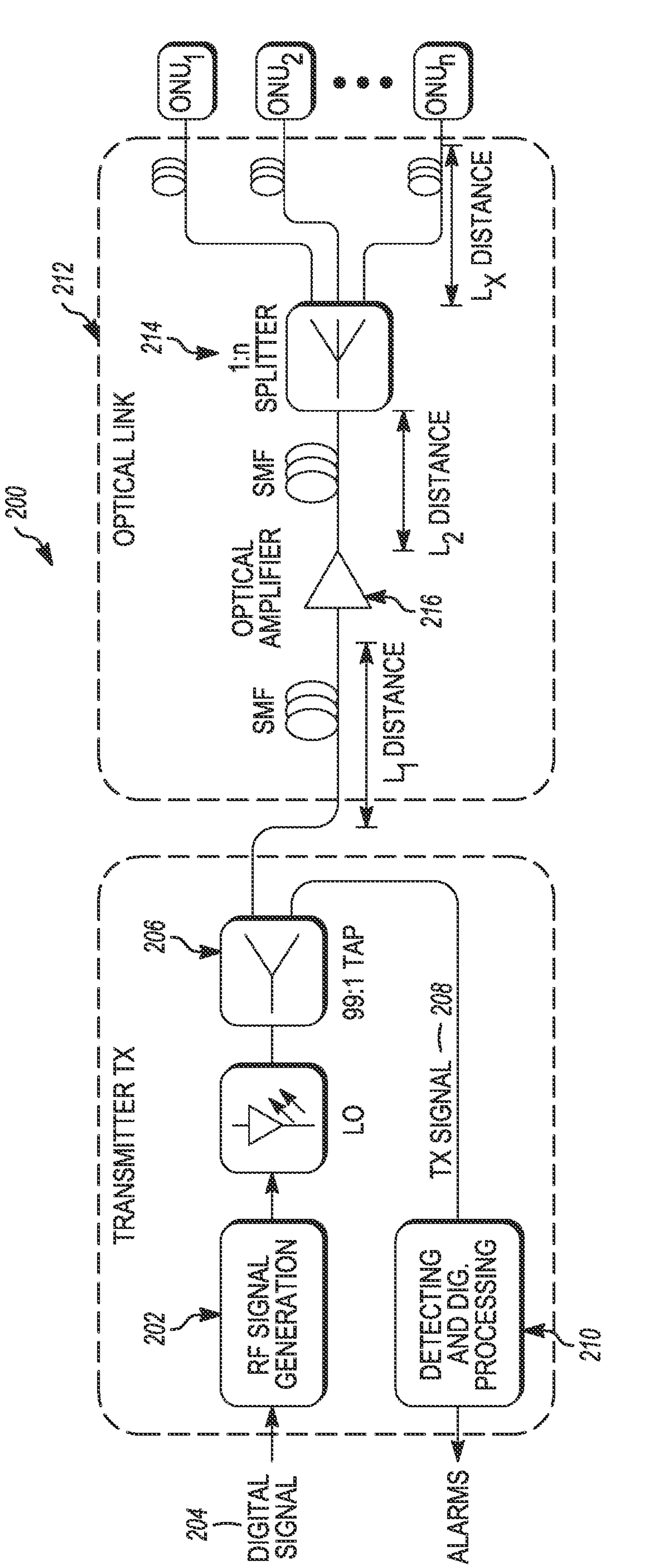
FIG. 2 is schematic of a single transmitter in a Radio Frequency on Glass (RFoG) scheme.
Figure 3:
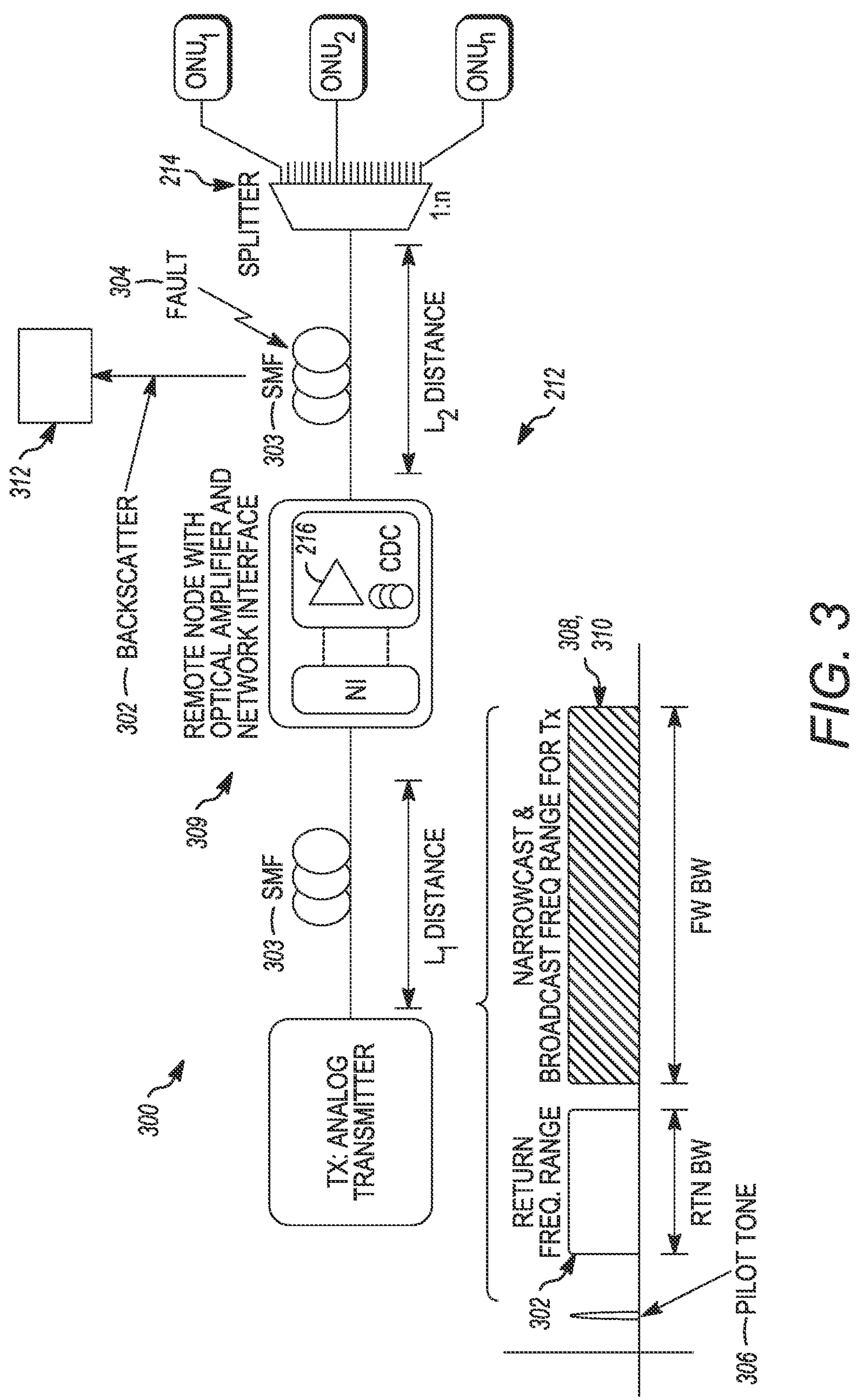
FIG. 3 illustrates an optical communication fiber link including a monitoring system for detecting a fault, according to one or more examples described herein.

FIG. 3 illustrates an optical communication fiber link 212 comprising a monitoring system leveraging these high optical powers so as to detect the backscattering 302 (e.g., having a return bandwidth) along the optical link 212 comprising an optical fiber 303 and identify the presence of absence of a fault 304 in the optical link 212. Examples of a fault include, but are not limited to, a break or cut in the SMF, 303, or other blockage or bend in the SMF that reduces the intensity of the transmission of the communication along the SMF. The monitoring system 300 includes an analog transmitter (Tx) transmitting a pilot tone 306 in addition to the communication comprising the the broadcast signal 308 and the narrowcast signal 310; a remote node 309 comprising a network interface (NI); an optical amplifier 216; the SMF; and a detection system 312 measuring and processing the backscattering. The detection system 312 monitors fluctuations or changes in the pilot tone 306 in the backscattering 302 so as to identify whether a fault 304 is present in the optical communication fiber link 212.

Figure 4:
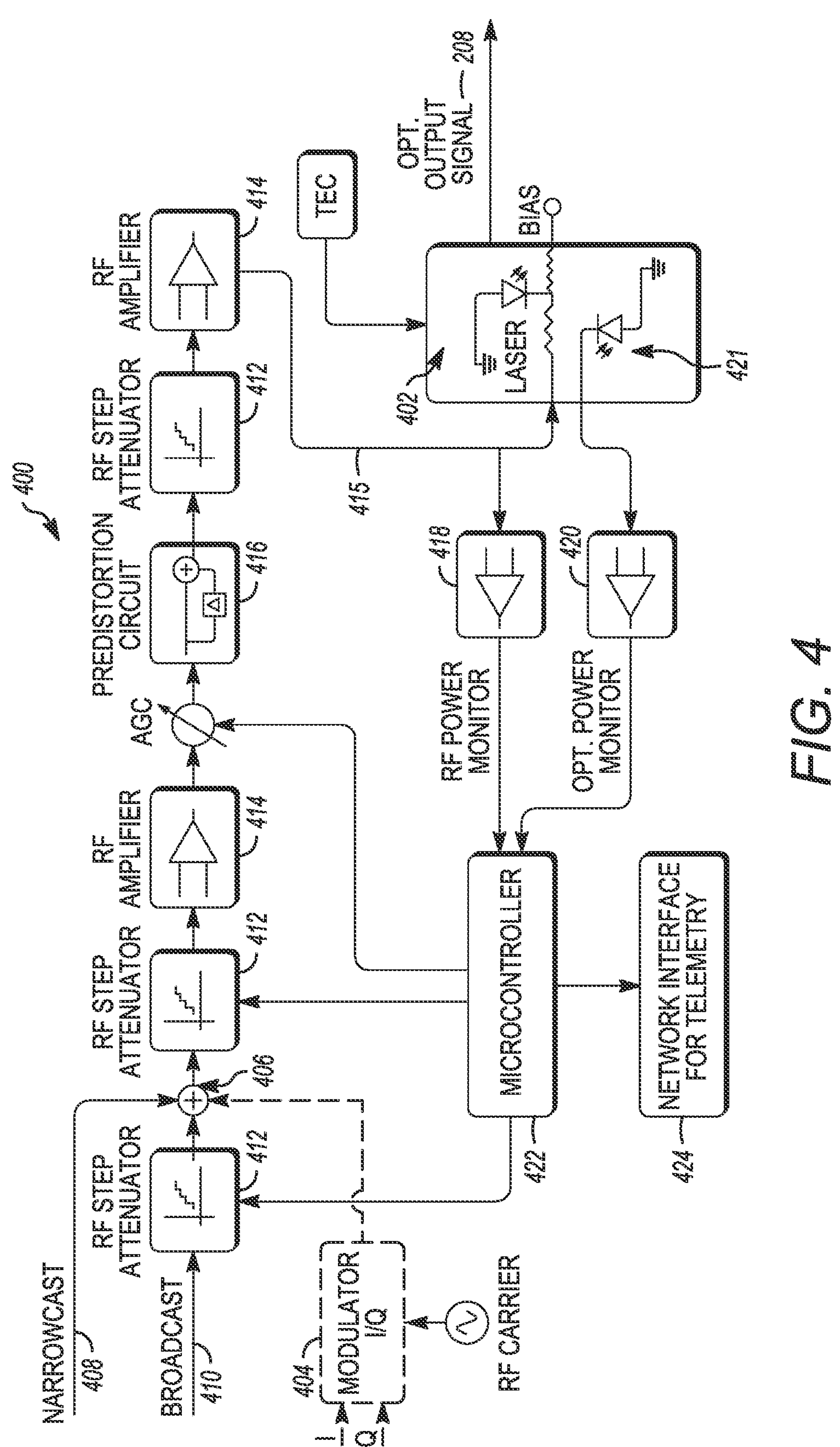
FIG. 4 illustrates an example circuit for a CATV analog optical transmitter outputting a low frequency tone useful for fault detection.
Figure 5A:
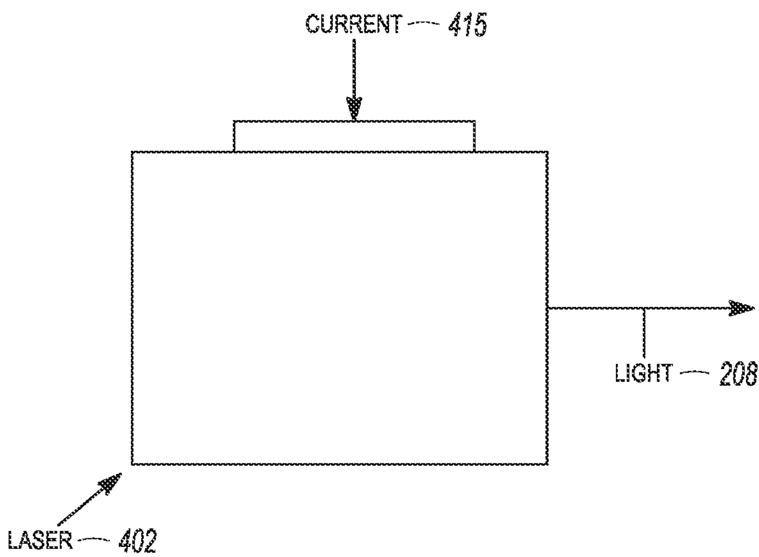
FIG. 5A illustrates an example laser outputting an optical signal including a pilot tone and FIG. 5B illustrates an example modulation scheme.
Figure 5B:
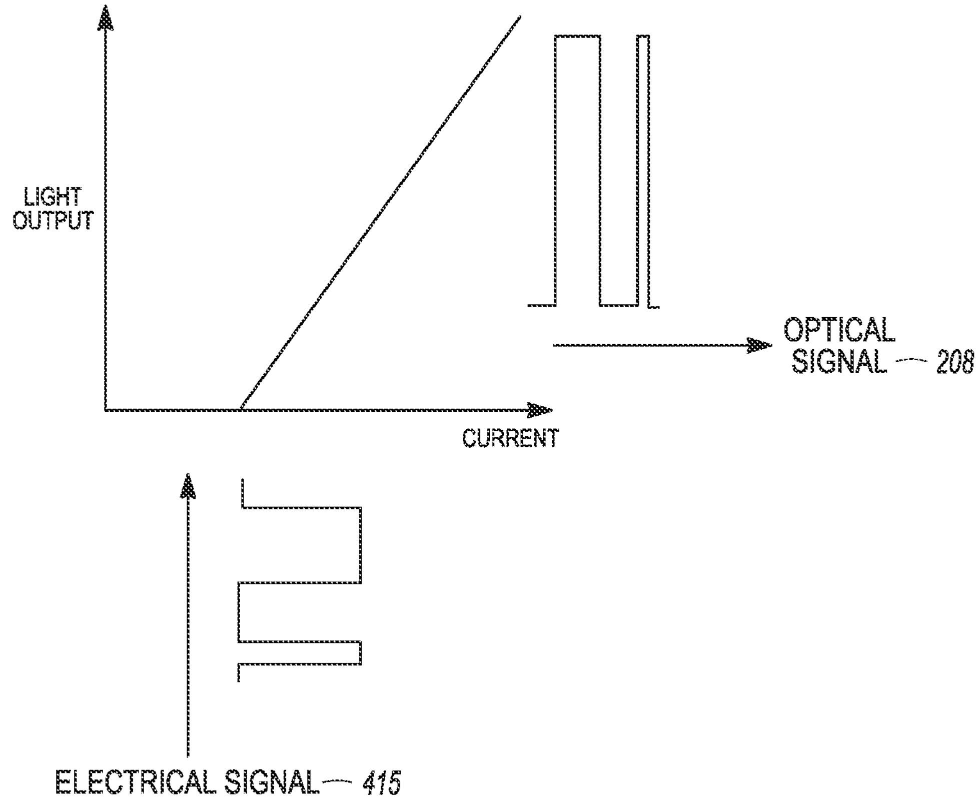

FIG. 4 illustrates an example transmitter (Tx) including a direct modulation laser 402 outputting an optical signal 208 modulated with an RF electrical signal; and circuitry (modulator 404 and adder 406) for adding the pilot tone 306 to the narrowcast RF electrical signal 408 and the broadcast RF electrical signal 410. The transmitter (Tx) further includes several stages after the adder, including RF step attenuators 412, automatic gain control circuit (AGC), RF amplifiers 414 for amplifying the combined RF electrical signal 415 (comprising the pilot tone, the narrowcast RF electrical signal 408, and the broadcast RF electrical signal 410), and a predistortion circuit 416 for preconditioning the RF electrical signals in order to mitigate against undesirable noise prior to input to the laser 402. Also shown in FIG. 4 are a Peltier cooler (TEC) for cooling the laser 402. The output power of the laser 402 and the power of the RF electrical signals are monitored via telemetry using an RF power monitor 418, optical power monitor 420 coupled to a photodiode 421, a micro-controller 422 and telemetry network interface 424. FIGS. 5A and 5B illustrate an example laser modulation scheme showing the combined RF electrical signal 415 (including the low frequency pilot tone, broadcast signal/narrowcast signal) modulates the laser output forming an intensity-modulated optical signal 208 (wherein the RF electrical signal is proportional to the intensity of the optical signal 208).

Figure 6:
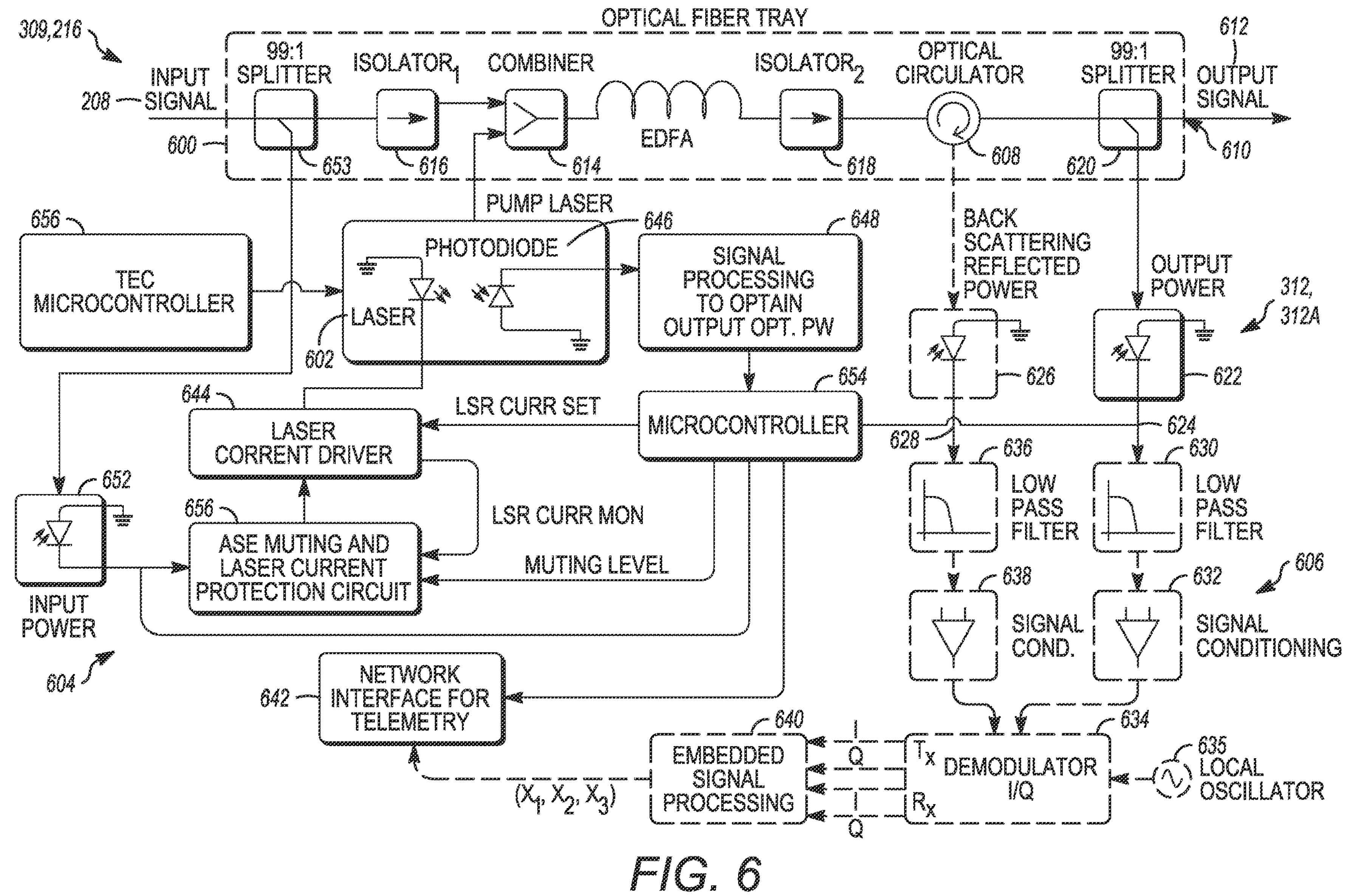
FIG. 6 illustrates a remote node including an amplifier and an example fault detection system useful for estimating the condition of the fiber in the optical communication fiber link.

FIG. 6 illustrates a remote node 309 comprising an amplifier 216 including the detection system 312 measuring the backscattering 302. As illustrated in FIG. 6, the amplifier 216 includes an optical fiber tray 600; a pump laser 602; electronics 604; and optical and processing elements or circuits 606 for analyzing the backscattering's 302 optical power. The optical fiber tray 600 includes an optical circulator 608, an output port 610 outputting the amplified output signal 612 downstream toward the consumer's receiver (e.g., ONU), an EDFA; a combiner 614 for combining, in the EDFA, the output from the pump laser 602 with the input optical signal 208 (received from the transmitter); and a first isolator 616 and a second isolator 618 to prevent optical oscillations in the amplifier. The second isolator 618 blocks transmission of the backscattering 302 to the pump laser 602 so as to prevent the backscattering from damaging the pump laser. As a result, the second Isolator also prevents measurement of a failure in segment L2 of the link 212 using an optical time-domain reflectometer (OTDR) from the transmitter side. Therefore, the detection system 312 includes the optical circulator 608 to tap off the backscattering 302 and bypass the isolators 616, 618. In the example shown, the optical circulator is located in the amplifier between the first segment L1 and the second segment L2.

FIG. 6 illustrates the detection system 312 further comprises a splitter 620 tapping a portion (e.g., 1%) of the output power of the amplified output signal 612 and containing the pilot tone 306; a first photo-detector 622 connected to detect the amplified output signal 612 tapped by the splitter 620 and output a reference signal 624 in response thereto; and a second photodetector 626 connected to detect the backscattering 302 diverted by the optical circulator 608 and output a backscattering signal 628 in response thereto.

As illustrated in FIG. 6, the detection system 312 further comprises first circuitry 312*a* determining, from the reference signal 624, at least one of a reference amplitude $A_1$ or a reference phase $\Phi_1$ of the pilot tone 306 in the amplified output signal 612. The first circuitry 312*a* comprises a first low pass filter 630 extracting, from the reference signal 624, a first band of frequencies including the pilot tone 306, a first signal conditioner 632 signal conditioning the first band of frequencies to form a first conditioned band of frequencies, and a de-modulator 634 de-modulating (using local oscillator 635) the first conditioned band of frequencies to obtain the pilot signal 306 (and the reference amplitude A1 and reference phase Φ1 of the pilot signal 306).

FIG. 6 further illustrates the detection system 312 includes second circuitry 312*b* determining, from the backscattering signal 628, at least one of a backscattered amplitude A2 or a backscattered phase $\Phi_2$ of the pilot tone 306 in the backscattering signal 628. The second circuitry comprises a second low pass filter 636 extracting a second band of frequencies including the pilot tone 306, a second signal conditioner 638 signal conditioning the second band of frequencies to form a second conditioned band of frequencies, and the de-modulator 634 de-modulating (using local oscillator 635) the second conditioned band of frequencies to obtain the backscattered pilot tone 306 (and backscattered phase $\Phi_2$ and backscattered amplitude A2 of the pilot tone 306).

An embedded signal processing circuit 640 processes the four signals $A_1$, $A_2$, $\Phi_2$ and $\Phi_2$ to obtain the parameters that describe the health of the optical link 212 (e.g., locating any failure in the optical link). The parameters (e.g., health data or figures of merit ×1, ×2, ×3) are transmitted from the remote node 309 using a network interface 642 for telemetry. In various examples, the backscattering signal 628 comprises a noise signal and the embedded signal processing can utilize a variety of different methods to process the noise signal to obtain the health data. In one or more examples, the signal processing circuit 640 comprises a Kalman filter estimating or predicting actual values for the noisy measured signals $A_1$, $A_2$, $\Phi_2$ and $\Phi_2$, wherein the estimated actual values are subsequently used to determine the presence or location of the fault 304.

FIG. 6 further illustrates the electronics 604 includes laser current driver 644 powering the pump laser 602, a photodiode 646 detecting the pump laser 602 output power, a signal processing circuit 648 measuring the output power using the output from the photodiode 646, and photodiode 652 measuring the power of the input optical signal 208 tapped using splitter 653. A microcontroller 654 controls the power provided to the laser 602 by controlling a muting level current to the ASE muting and laser current protection circuit 656. The ASE muting and laser current protection circuit controls the current outputted from the laser current driver 644 using feedback comprising the power of the input optical signal 208 received from the photodiode 652 and a monitor of the laser current received from the laser current driver 644.

Figure 7A:
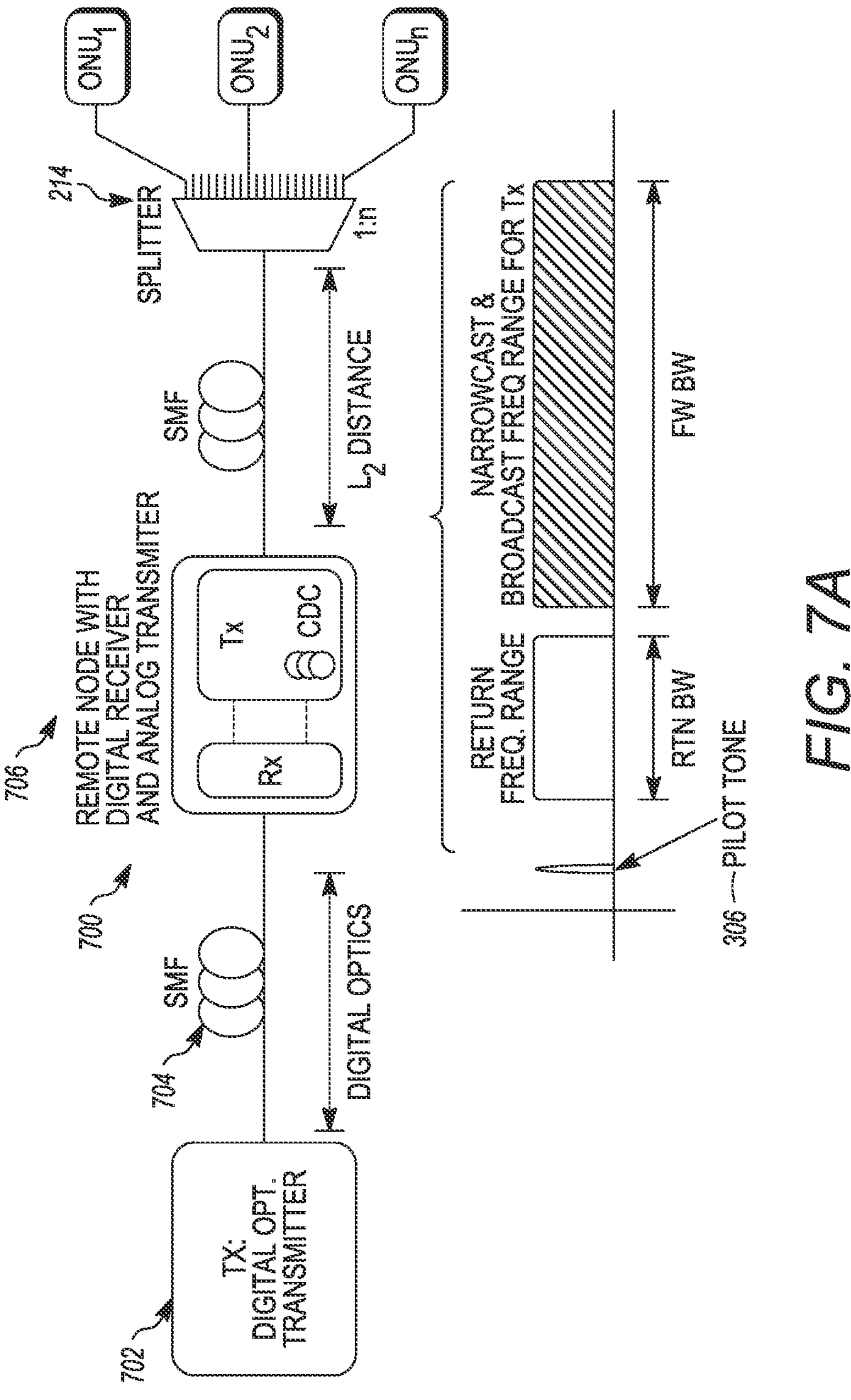
FIG. 7A illustrates an example network comprising a headend connected via an optical link to a remote node including a transmitter.
Figure 7B:
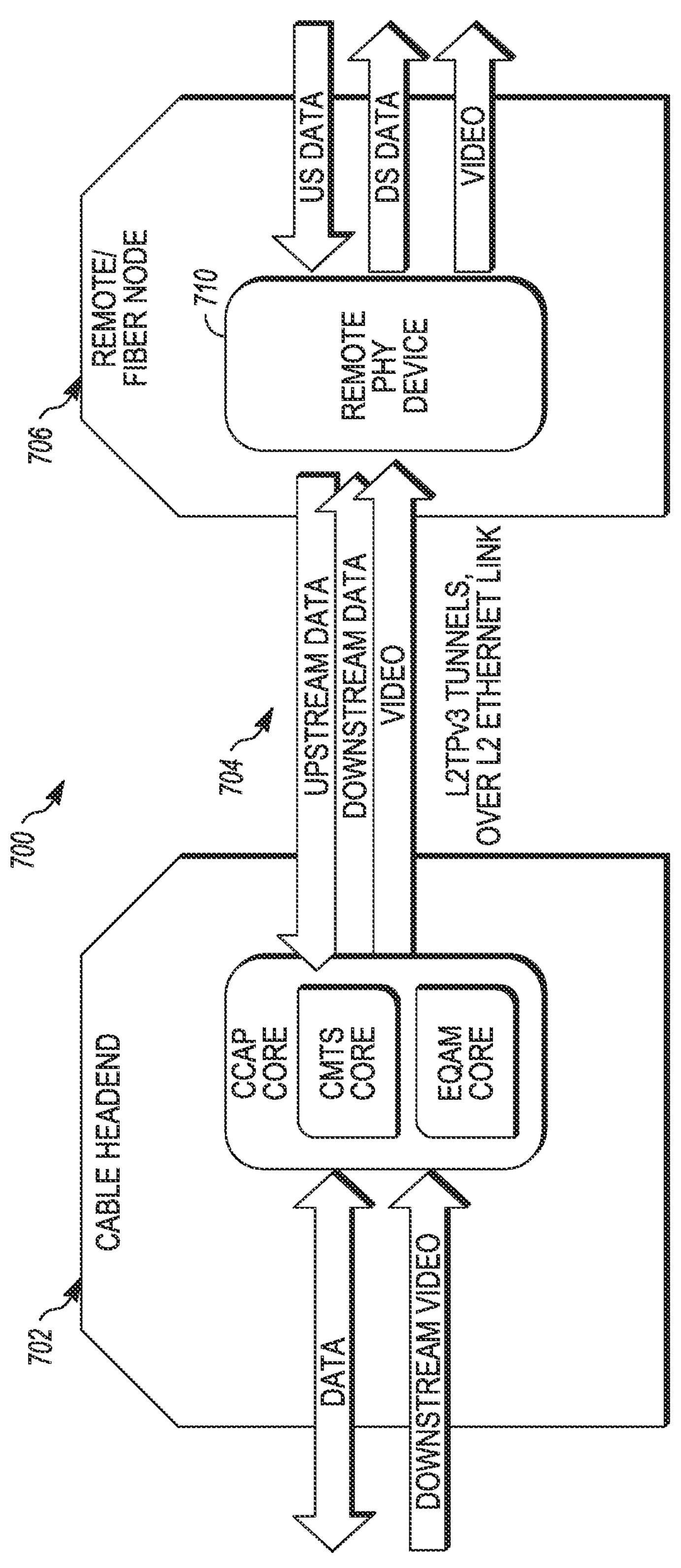
FIG. 7B illustrates an example network including a cable headend connected to the remote node via an ethernet connection.

Second Example: Failure Detection System Integrated in Remote Node Comprising a Transmitter FIGS. 7A and 7B illustrate example optical communication networks 700 including a headend 702 and a link 704 connecting to a remote node 706 including the analog optical transmitter Tx. In FIG. 7A, the headend 702 comprises a digital optical transmitter Tx and the link 704 comprises a digital optics link comprising a SMF. The remote node 706 comprises a digital receiver (Rx), comprising a photodetector receiving an optical signal (e.g., ethernet) from the headend 702; and the optical transmitter Tx retransmits after modulating the optical signal (e.g., with OFDM modulators) and the pilot tone 306.

FIG. 7B illustrates and example wherein the headend 702 comprises a cable headend including a Converged Cable Access Platform (CCAP) core connected to the remote node 706 via an ethernet link 704, and the remote node comprises a remote PHY device including the analog optical transmitter Tx. In some examples, the headend 702 comprises a RF transmitter and the link connecting to the remote node 706 is a coaxial cable or RF link. A remote node transmitter ("remote PHY") is useful for distributed access architectures where the physical RF layer is pushed to the edge of the access network. In some examples, the remote PHY device (RPD, 710) comprises PHY related circuitry, such as downstream Quadrature Amplitude Modulation (QAM) and Orthogonal Frequency Division Multiplexing (OFDM) modulators, upstream QAM and OFDM demodulators, as well as the circuitry for encoding the low frequency pilot tone 306.

Figure 8:
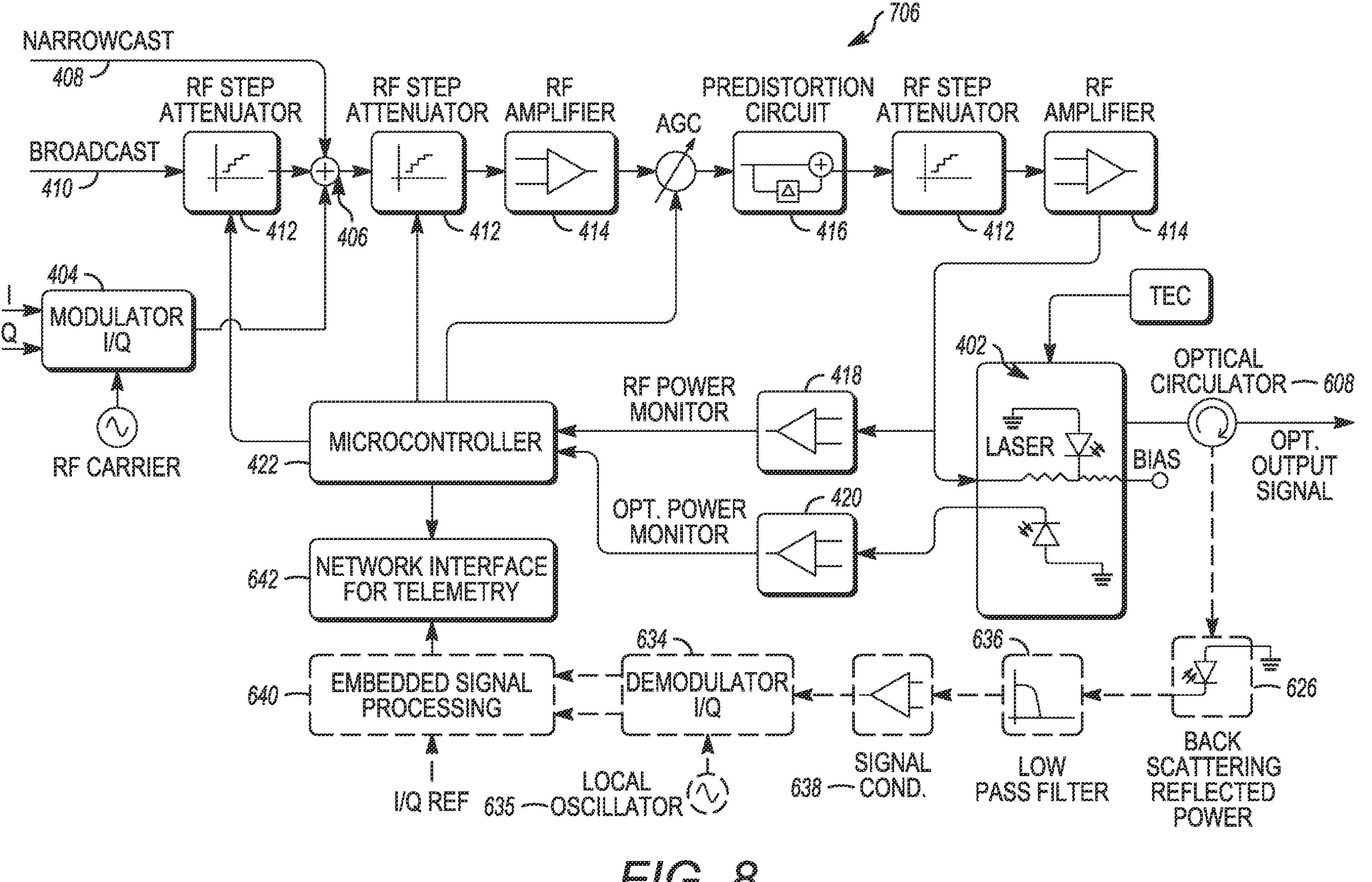
FIG. 8 illustrates an example remote node comprising an analog transmitter coupled to a failure detection system.

FIG. 8 is a system level diagram illustrating the remote node 706 comprising a single device including the transmitter Tx and the detection system 312 for detecting the backscattering 302 and monitoring the health of the optical communication fiber link. The detection system includes some of the components illustrated in FIG. 6.

Third Example: Measurement of Backscattering

Figure 9:
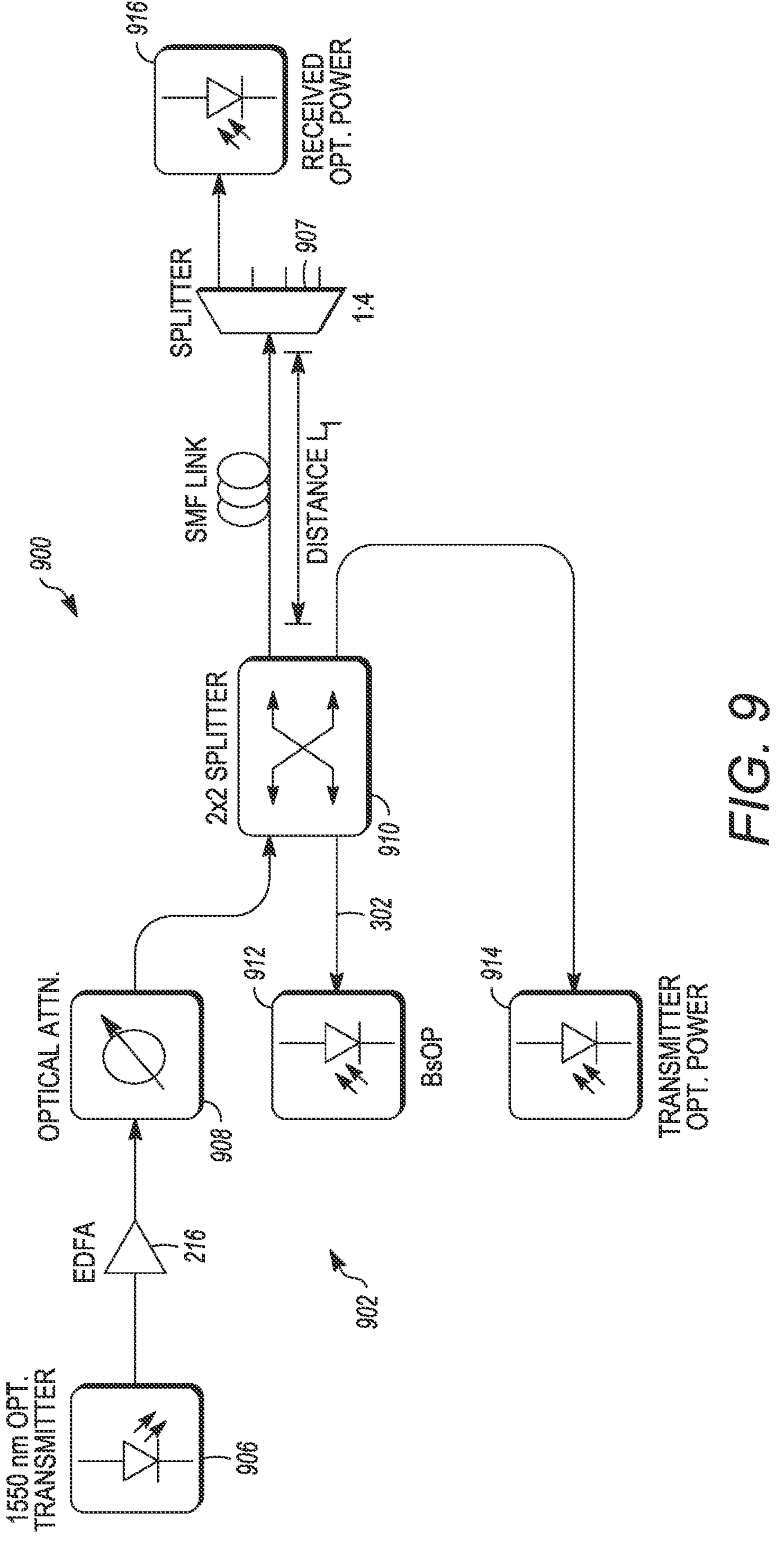
FIG. 9 illustrates an experimental setup used to demonstrate fault detection by measuring backscattering in an optical communication fiber link.

FIG. 9 illustrates an experimental set up comprising an optical communication fiber link 900 including a monitoring system 902 used for demonstrating fault detection and location by measuring backscattering 302 of the electromagnetic radiation 904 outputted from a laser 906 and amplified by an amplifier 216 (EDFA). The electromagnetic radiation 904 comprises the optical signal 208 and has a 1550 nm wavelength. The output from the amplifier is coupled to a 1:4 splitter 907 via a variable optical attenuator 908, a 2 by 2 splitter 910, and an SMF link. Backscattering optical power BSOP from the SMF link and transmitted through the 2 by 2 splitter was measured using a photodiode 912. Transmitted optical power of the electromagnetic radiation outputted by the 2 by 2 splitter 910 was measured using photodiode 914 and received optical power of the electromagnetic radiation outputted from the 1:4 splitter 907 was measured using photodiode 916.

Figure 10:
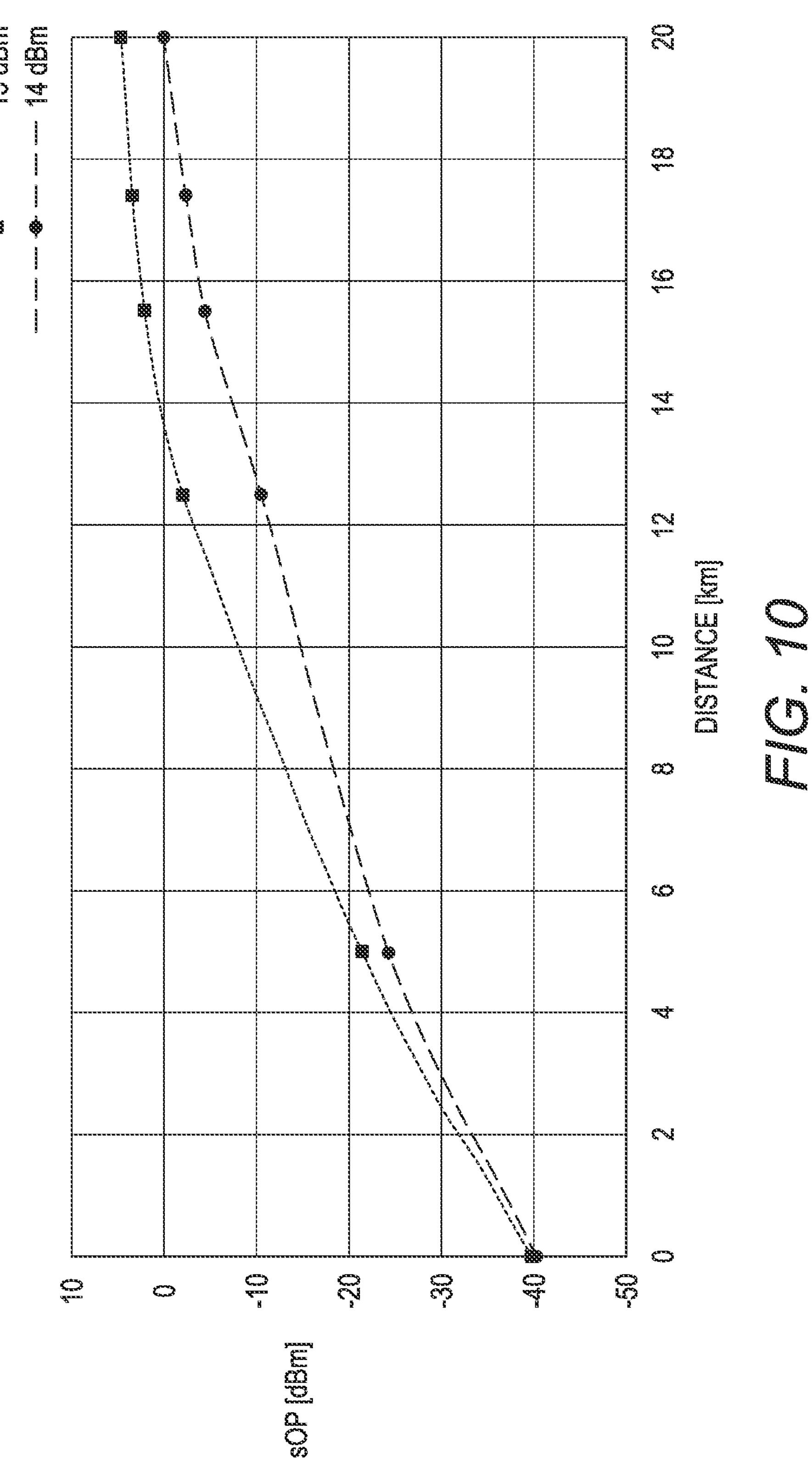
FIG. 10 illustrates measured backscattering optical power (BsOP) as function of the fiber length (distance) using the setup in FIG. 9.
Figure 11:
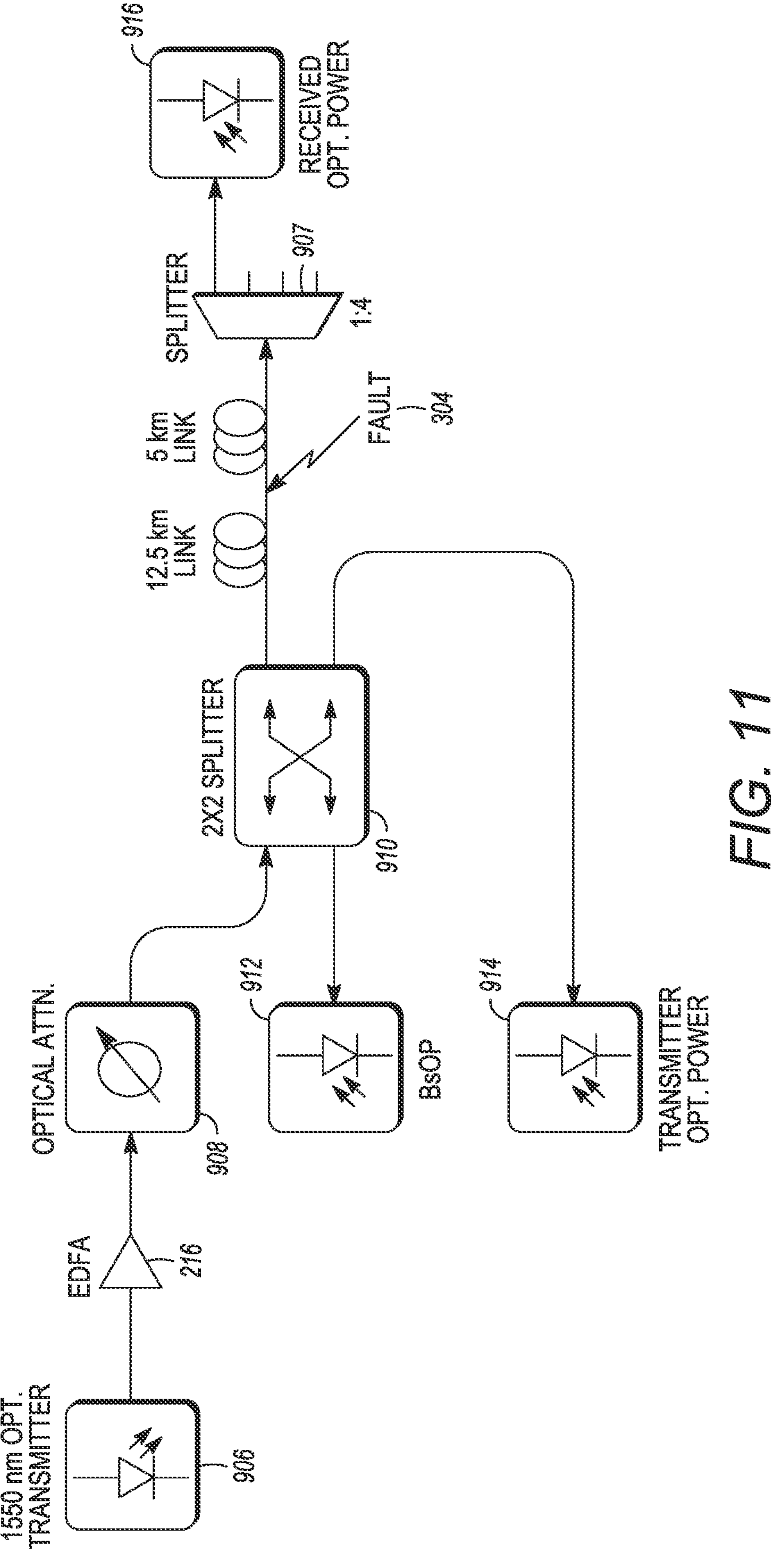
FIG. 11 illustrates an example experimental set up comprising a disconnect between two fibers that simulates a fault.
Figure 12:
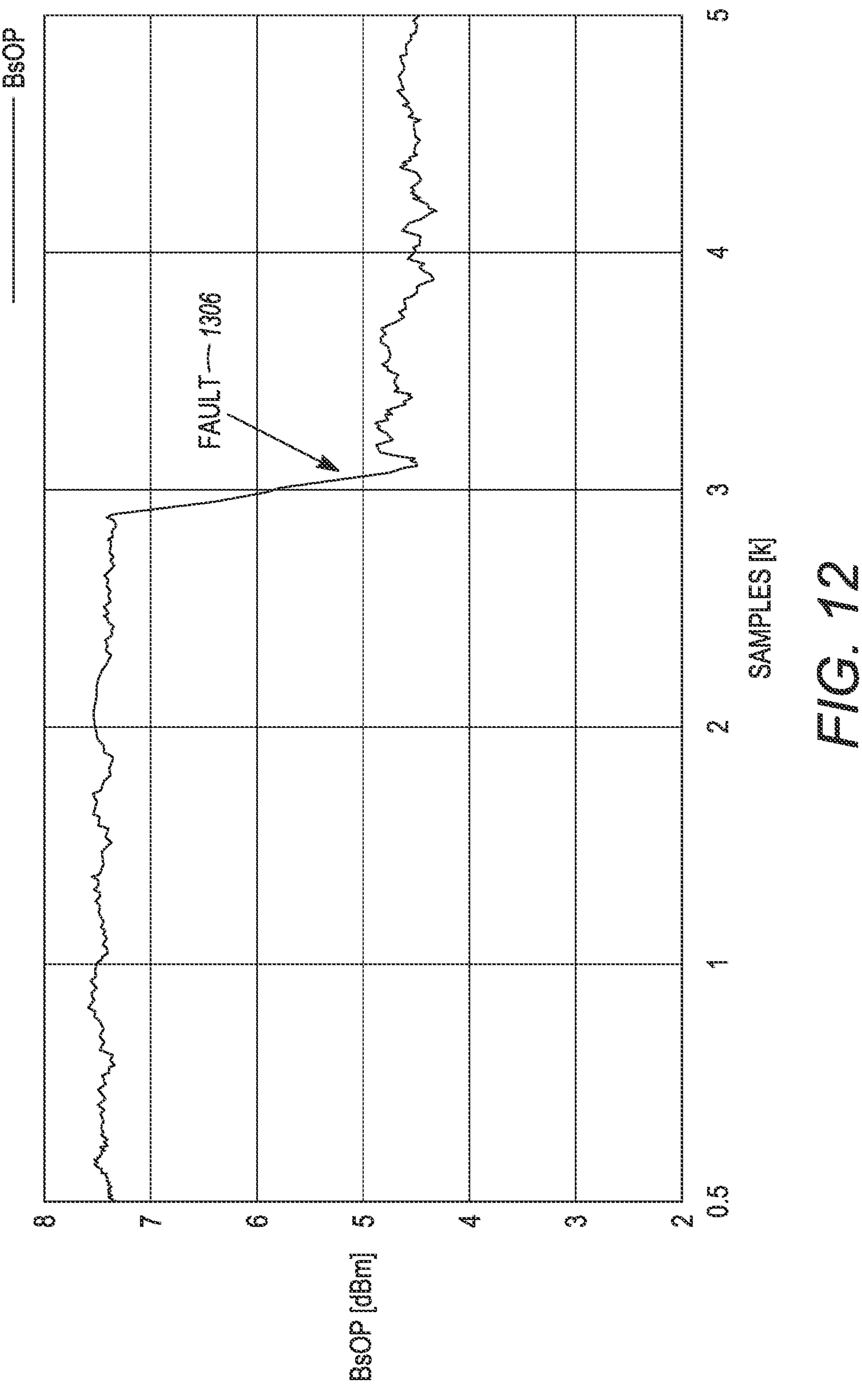
FIG. 12 plots backscattering as a function of distance in the optical fiber in FIG. 11, evidencing the presence of a fault at a distance of 5 kilometers (km) along the optical fiber of having a length of 17.5 km (fault simulated by disconnect between a 12.5 km long fiber and a 5 km long fiber).

Different spools of SMF link (lengths of 5 km, 12 km, 16 km, 17.5 km and 20 km) were used in order to characterize the BSOP as a function of link distance. FIG. 10 plots the measured BSOP as a function of link distance with 14 dBm and 15 dBm of optical launch power at the output of the optical attenuator 908. In one or more examples, the photodetector 912 can measure BsOP from 3.7 dB inserted in the 2 by 2 splitter. FIG. 11 illustrates how a fault 304 was simulated by disconnecting two spools (12.5 km long spool disconnected from 5 km long spool) and FIG. 12 plots the resulting abrupt change in magnitude of BsOP indicating the presence of the fault 304. The location of the abrupt change in magnitude is used to estimate the distance to the fault at the disconnection site between the two spools.

Fourth Example: Signal Processing With a Kalman Filter

Figure 13:
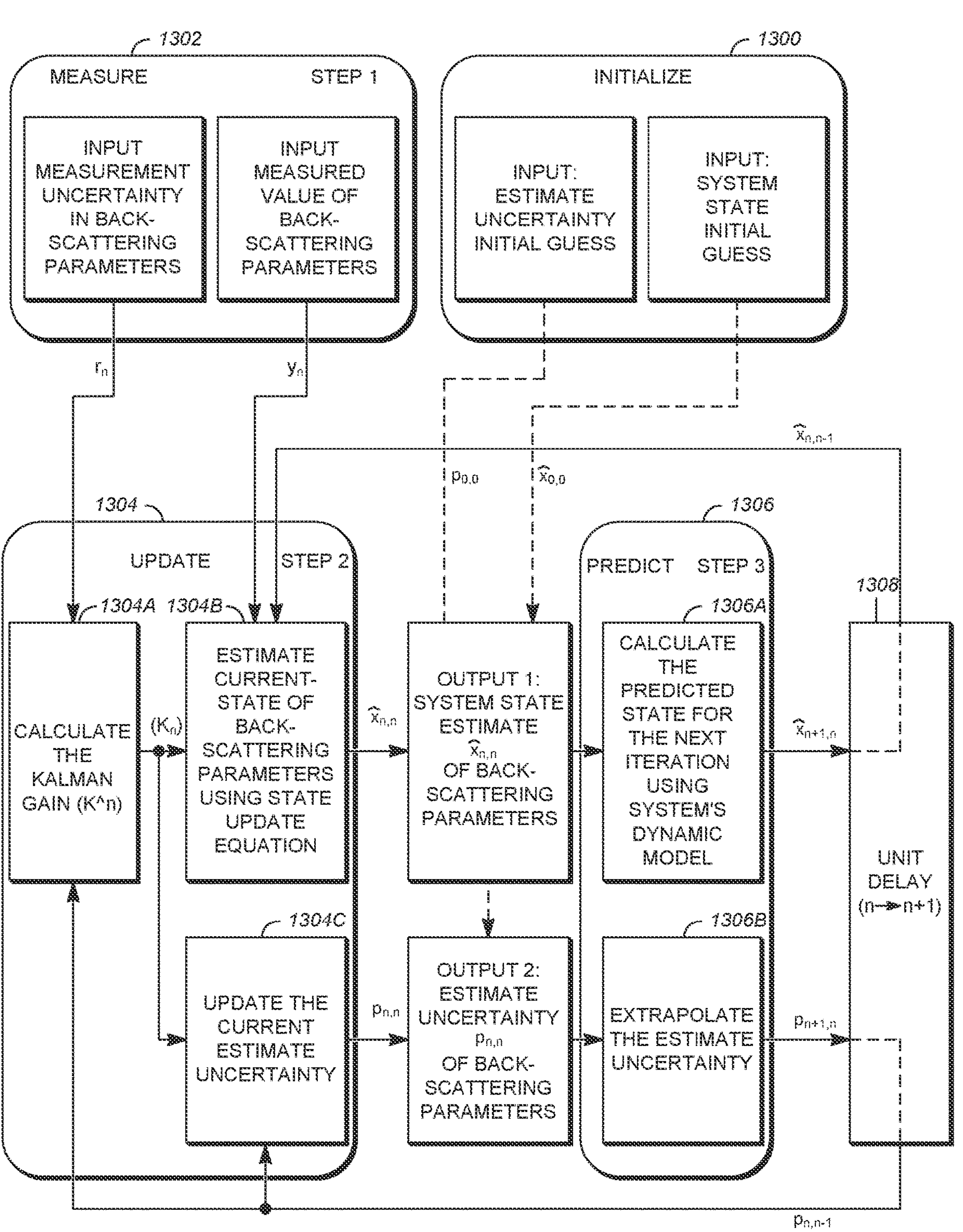
FIG. 13 illustrates a Kalman filter algorithm used to determine parameters representing backscattering propagation in a fiber, and wherein the parameters are used to predict the presence of and/or distance to a fault in the fiber.

FIG. 13 illustrates a method using a Kalman filter configured to output an estimate (e.g., a prediction) of various backscattering propagation parameters useful for determining the location of a failure in the optical link. The method comprises the following steps iterated over a plurality of n time steps (except for Block 1300) to estimate actual values for the backscattering amplitude $A_2$ and backscattering phase $\Phi_2$.

Block 1300 represents initializing the Kalman filter, comprising inputting an initial guess for the uncertainty of the estimate $p_{0,0}$ (uncertainty in $A_2$ and $\Phi_2$) and initial guesses/estimates $x_{0,0}$ of the values of $A_2$ and $\Phi_2$ (system states).

Block 1302 represents step 1, inputting input parameters of $y_n = A_2$, $\Phi_2$ along with their respective measurement uncertainties $r_n$ that are measured at the $n^{th}$ iteration. In one or more examples, the measurement uncertainty of $A_2$ is the Gaussian Full Width at Half Maximum of the measurement of $A_2$ and the measurement uncertainty of $\Phi_2$ is the Gaussian Full Width at Half Maximum of the measurement of $\Phi_2$.

Block 1304 represents step 2, updating the Kalman filter. The step comprises calculating (block 1304*a*) the Kalman gain $K_n$ for each of the measured input parameters $r_n$ and $y_n$, using $r_n$ and $y_n$ as inputs as well as the uncertainties $p_{n+1,n}$ calculated in the $n-1^{th}$ iteration (if available). Block 1304*b* illustrates the step further comprises estimating and outputting the system state estimate $x_{n,n}$ for each of the parameters $y_n$, using the state update equation, and inputs comprising the Kalman gain and a previous estimate $x_{n+1,n}$ calculated in the $n-1^{th}$ iteration (if available). Block 1304*c* illustrates the step further comprises updating and outputting the current estimate uncertainty $p_{n,n}$ for each of the parameters $r_n$, using inputs comprising the Kalman gain and the uncertainty estimate $p_{n+1,n}$ calculated in the $n-1^{th}$ iteration (if available)

Block 1306 represents step 3, predicting the uncertainties and estimates used as inputs for the next iteration using the Kalman filter's dynamic model equation(s). Block 1306*a* illustrates the predicting comprises calculating the predicted state estimate $x_{n+1,n}$ for $A_2$ and $\Phi_2$ and extrapolating (block 1306*b*) the estimate uncertainty $p_{n+1,n}$ for $A_2$ and $\Phi_2$.

Block 1308 represents iterating, comprising repeating steps 1302-1306 for a series of consecutive n time steps, wherein the interval between the time steps is a unit delay ($n \rightarrow n+1$).

After the estimate $x_{n+1,n}$ has sufficiently converged to within a threshold value, the $x_{n+1,n}$ comprising estimates of $A_2$ and $\Phi_2$ are outputted and used to estimate or predict the distance to and/or presence of a fault in the optical communication fiber link 212.

Example Method of Monitoring Health of an Optical Communication Fiber Link

Figure 14:
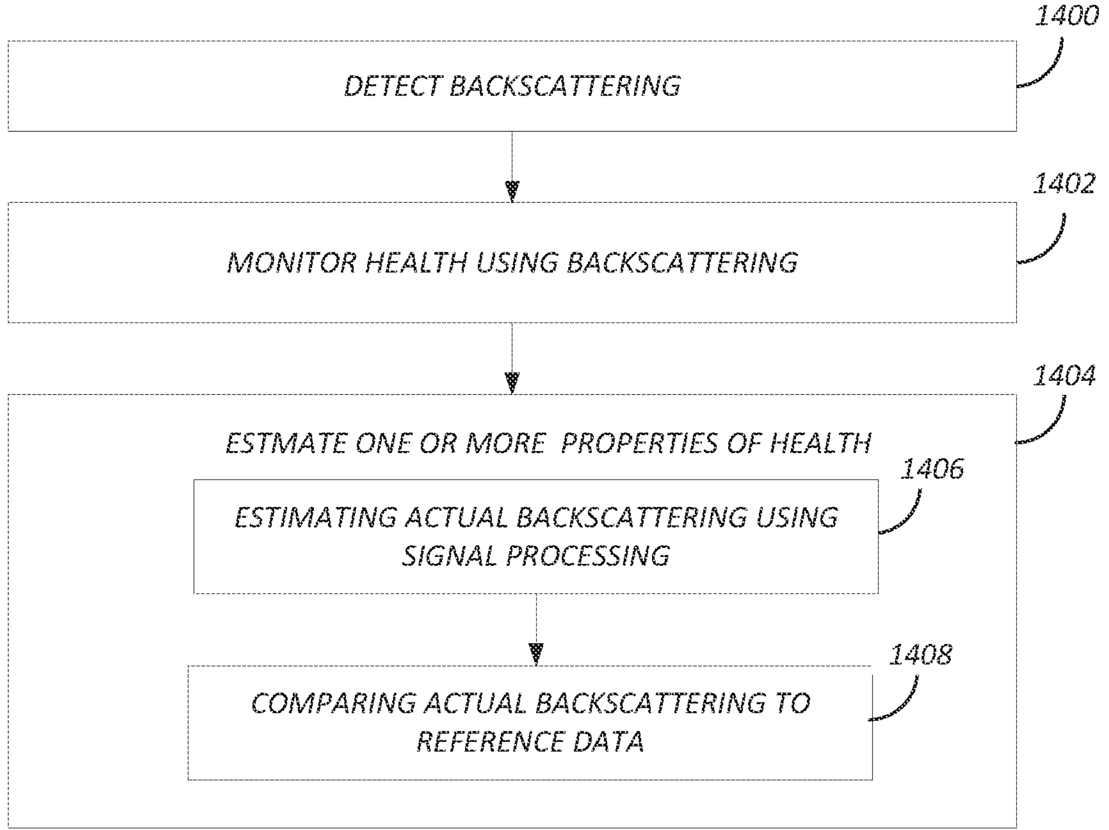
FIG. 14 is a flowchart illustrating a method of monitoring the health of an optical communication fiber link.

FIG. 14 is a flowchart illustrating a method for (e.g., on-line) monitoring of an optical communication fiber link. The method comprises the following steps.

Block 1400 represents detecting a change in a scattering of electromagnetic radiation from the optical communication fiber link.

Block 1402 represents monitoring, from the change, a health of the optical communication fiber link. In one or more examples, a fault or failure in the optical communication link is identified by a drop in backscattering below a threshold value.

Block 1404 represents estimating the one or more properties (e.g., figures of merit) of the health. Example properties include, but are not limited to, estimating temperature at one or more locations in the optical communication fiber link, or estimating the location of (e.g., a distance to) a fault in the optical communication fiber link. In one or more examples, the estimating comprises predicting or estimating the actual backscattering (e.g., actual $A_2$) in view of noise in the measurement of the backscattering (e.g., using signal processing such as a Kalman filter), as illustrated in Block 1406, and comparing the actual backscattering to reference data so as to determine the health property (as illustrated in Block 1408). In one or more examples, the reference data comprises the backscattering optical power as a function of distance or length along the optical fiber and the transmitted optical power (as illustrated in FIG. 11) and the distance to the fault is determined by looking up the distance associated with the actual backscattering according to the reference data (and depending on the transmitted optical power $A_1$). In other examples, the reference data further includes the transmitted optical power ($A_1$) and the distance to the fault is determined by correlating the actual backscattering with the transmitted output power. In yet further examples, the distance to the fault is known from the location of the photodetector measuring the fluctuation/change in the backscattering. In yet further examples, the reference data comprises scattering amplitude or power as a function of temperature of the fiber and the temperature is determined by looking up the temperature associated with the estimated actual value of the backscattering amplitude.

In one or more further examples, the estimating is performed using a machine learning algorithm (e.g., artificial intelligence) trained on training backscattering data. In one or more examples, the training backscattering data comprises backscattering amplitude and phase data in the presence and absence of a fault.

Hardware Environment

Figure 15:
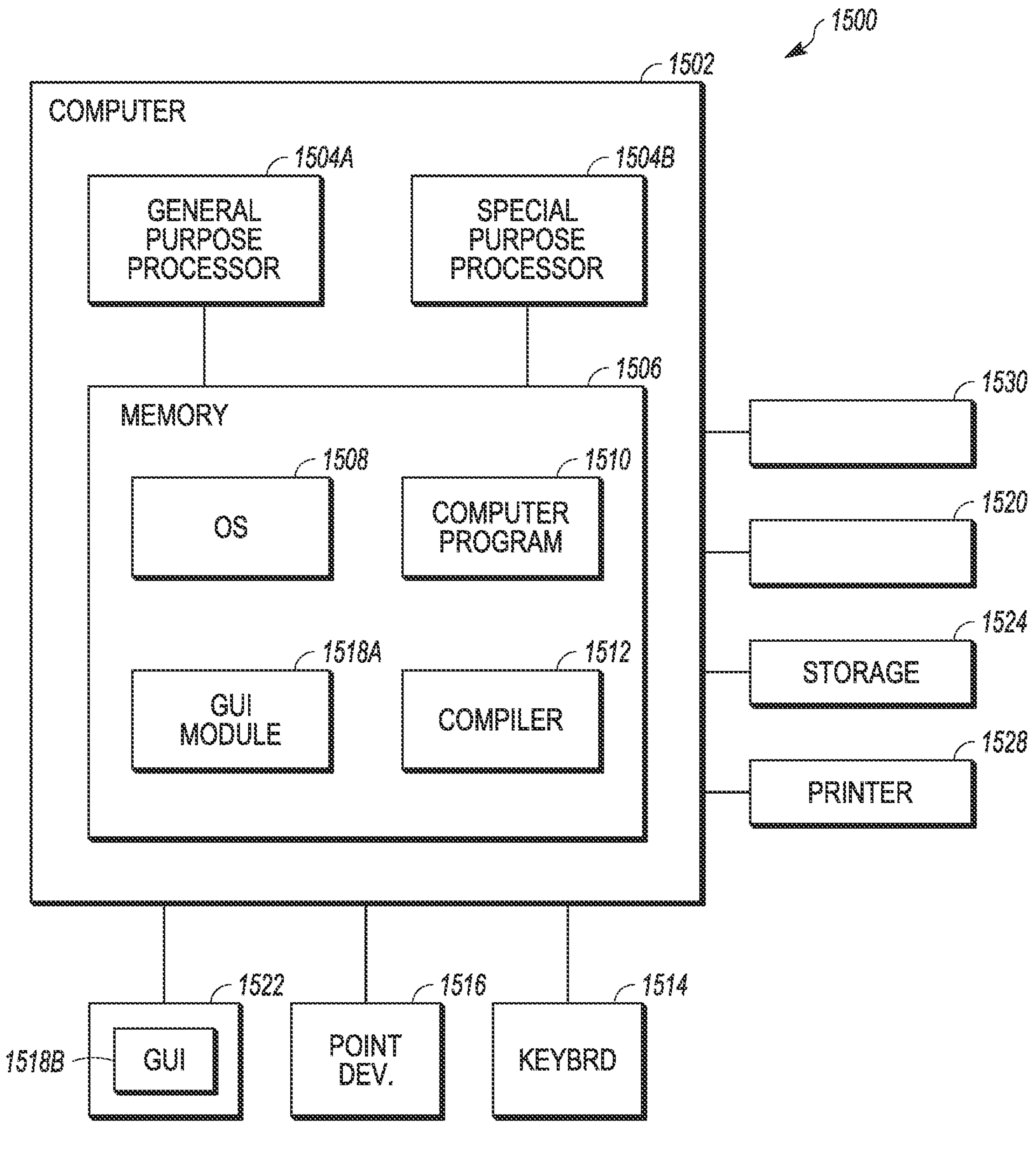
FIG. 15 illustrates an exemplary computer system that could be used to implement processing elements of online monitoring system.

FIG. 15 illustrates an exemplary computer system 1500 that could be used to implement processing elements of the above disclosure. The computer 1502 comprises a processor 1504 and a memory, such as random access memory (RAM) 1506. The computer 1502 is operatively coupled to a display 1522, which presents images such as windows to the user on a graphical user interface 1518B. The computer 1502 may be coupled to other devices, such as a keyboard 1514, a mouse device 1516, a printer 1528, etc. Of course, those skilled in the art will recognize that any combination of the above components, or any number of different components, peripherals, and other devices, may be used with the computer 1502.

Generally, the computer 1502 operates under control of an operating system 1508 stored in the memory 1506, and interfaces with the user to accept inputs and commands and to present results through a graphical user interface (GUI) module 1518A. Although the GUI module 1518B is depicted as a separate module, the instructions performing the GUI functions can be resident or distributed in the operating system 1508, the computer program 1510, or implemented with special purpose memory and processors. The computer 1502 also implements a compiler 1512 which allows an application program 1510 written in a programming language such as COBOL, C++, FORTRAN, or other language to be translated into processor 1504 readable code. After completion, the application 1510 accesses and manipulates data stored in the memory 1506 of the computer 1502 using the relationships and logic that was generated using the compiler 1512. The computer 1502 also optionally comprises an external communication device such as a modem, satellite link, Ethernet card, or other device for communicating with other computers.

In one embodiment, instructions implementing the operating system 1508, the computer program 1510, and the compiler 1512 are tangibly embodied in a computer-readable medium, e.g., data storage device 1520, which could include one or more fixed or removable data storage devices, such as a zip drive, floppy disc drive 1524, hard drive, CD-ROM drive, tape drive, etc. Further, the operating system 1508 and the computer program 1510 are comprised of instructions which, when read and executed by the computer 1502, causes the computer 1502 to perform the operations herein described. Computer program 1510 and/or operating instructions may also be tangibly embodied in memory 1506 and/or data communications devices 1530, thereby making a computer program product or article of manufacture. As such, the terms "article of manufacture," "program storage device" and "computer program product" as used herein are intended to encompass a computer program accessible from any computer readable device or media.

In one or more embodiments, the computer 1502 comprises one or more circuits, or an application specific integrated circuit (ASIC), or a field programmable gate array (FPGA).

Those skilled in the art will recognize many modifications may be made to this configuration without departing from the scope of the present disclosure. For example, those skilled in the art will recognize that any combination of the above components, or any number of different components, peripherals, and other devices, may be used.

Example System and Method Embodiments

Illustrative, non-exclusive examples of inventive subject matter according to the present document are described in the following examples.

1. An optical communication fiber link (212), comprising:
   a monitoring system (300) connected to an optical fiber (e.g., SMF, 303) transmitting electromagnetic radiation (904) including a communication, the monitoring system (902):
   including a detection system (312) detecting a scattering of the electromagnetic radiation (904) from the optical fiber;
   monitoring the scattering for an (e.g., abnormal) change; and
   determining, from the (e.g., abnormal) change, an absence or a presence of a fault (304) in the optical fiber.
2. The optical communication fiber link (212) of example 1, wherein the monitoring system (300) determines a temperature of the optical fiber from the scattering.
3. The optical communication fiber link (212) of example 1, wherein the monitoring system (902) includes at least one of a circuit or a computer (1502) determining the absence or the presence of the fault (304) by comparing the scattering to reference data.
4. The optical communication fiber link (212) of example 1, wherein the reference data comprises at least one of:
   an optical power of the electromagnetic radiation (904) transmitted by the optical fiber, or
   a measurement of a backscattered optical power as a function of a distance along the optical fiber.
5. The optical communication fiber link (212) of example 1, wherein the detection system (312) detects the scattering comprising a noisy signal (628) and the monitoring system (300) includes a computer (1502) or circuit executing signal processing, digital processing, or a Kalman filter estimating, predicting, or determining an actual value for the scattering from the noisy signal (628).
6. The optical communication fiber link (212) of example 1, wherein:
   the optical communication fiber link (212) includes:
   a transmitter (TX);
   an amplifier (216); and
   a receiver (e.g., ONU); wherein:
   the optical fiber comprises a first segment transmitting the electromagnetic radiation (904) from the transmitter to the amplifier (216) and a second segment transmitting the electromagnetic radiation (904) from the amplifier (216) to the receiver, wherein the amplifier (216) amplifies an intensity of the electromagnetic radiation (904); and
   the detection system (312) includes a photodetector positioned to detect the scattering comprising a backscattering (302) of the electromagnetic radiation (904) from one or more predetermined locations in the second segment or the first segment.
7. The optical communication fiber link (212) of example 6, wherein the transmitter further comprises:
   a laser (402) outputting the electromagnetic radiation (904); and
   a modulator modulating the laser (402) such that the laser (402) outputs the electromagnetic radiation (904) comprising a pilot signal (628) and the communication distinct from the pilot signal (628), wherein the monitoring system (300) detects the backscattering (302) by demodulating the pilot signal (628) from the backscattering (302).
8. The optical communication fiber link (212) of example 7, wherein the monitoring system (300) further comprises:
   a first photodetector positioned to detect the electromagnetic radiation (904) after an output from at least one of the transmitter or the amplifier (216) and output a reference signal (628) (624) in response thereto;
   the photodetector comprising a second photodetector (626) positioned to detect the backscattering (302) from the one or more predetermined locations and output a backscattering (302) signal (628) in response thereto;
   a computer (1502) or circuit comparing the reference signal (628) (624) and the backscattering (302) signal (628) so as to determine the absence or the presence of the fault (304).
9. The optical communication fiber link (212) of example 7, wherein the monitoring system (300) further comprises:
   a first photodetector positioned to detect the electromagnetic radiation (904) after an output from at least one of the transmitter or the amplifier (216) and output a reference signal (628) (624) in response thereto;

the photodetector comprising a second photodetector (626) positioned to detect the backscattering (302) from the one or more predetermined locations and output a backscattering (302) signal (628) in response thereto;

first circuitry (312*a*) determining, from the reference signal (628) (624), at least one of a reference amplitude or a reference phase of the pilot signal (628) in the reference signal (628) (624);

second circuitry (312*b*) determining, from the backscattering (302) signal (628), at least one of a backscattering (302) amplitude or a backscattering (302) phase of the pilot signal (628) in the backscattering (302);

a computer (1502) or circuit determining the presence or absence of the fault (304) using the reference phase, the reference amplitude, the backscattering (302) phase, and the backscattering (302) amplitude.

10. The optical communication fiber link (212) of example 9, wherein:

the pilot signal (628) comprises a pilot tone (306) low frequency pilot tone (306) (306);

the first circuitry (312*a*) comprises a first low pass filter (630, 636) extracting a first band of frequencies including the pilot tone (306), a signal (628) first signal (628) conditioner (632) conditioning the first band of frequencies to form a first conditioned band of frequencies, and a de-modulator de-modulating the first conditioned band of frequencies to obtain the reference phase and the reference amplitude of the pilot signal (628); and the second circuitry (312*b*) comprises a second low pass filter (630, 636) extracting a second band of frequencies including the pilot tone (306), a signal (628) second signal (628) conditioner (638) conditioning the second band of frequencies to form a second conditioned band of frequencies, and the de-modulator de-modulating the second conditioned band of frequencies to obtain the backscattering (302) phase and backscattering (302) amplitude of the pilot signal (628).

11. The optical communication fiber link (212) of example 10, wherein the first photodetector, the second photodetector (626), the first circuitry (312*a*), and the second circuitry (312*b*) are integrated with the transmitter or the amplifier (216).

12. The optical communication fiber link (212) of example 10, wherein:

the backscattering (302) phase and backscattering (302) amplitude comprise noisy signals, the computer (1502) or circuit executes a Kalman filter (630, 636) estimating, from the noisy signals, actual values for the backscattering (302) phase and the backscattering (302) amplitude; and the computer (1502) or circuit estimates the presence or absence of the fault (304) by comparing the actual values estimated by the Kalman filter (630, 636) with reference data.

13. The optical communication fiber link (212) of example 12, wherein:

the reference data comprises:

a backscattering (302) optical power as a function of a distance along the optical fiber;

transmitted power of the electromagnetic radiation (904); and the computer (1502) or circuit estimates a location of the fault (304) as the distance associated with the actual value of the backscattering (302) amplitude estimated by the Kalman filter (630, 636) taking into account the transmitted power of the electromagnetic radiation (904).

14. The optical communication fiber link (212) of example 11, wherein the reference data includes a transmitted optical power of the electromagnetic radiation (904) and a distance to the fault (304) is determined by correlating the actual value of the backscattering (302) amplitude with the transmitted output power.

15. The optical communication fiber link (212) of example 1, further comprising a remote node (309, 706) including the detection system (312) and at least one of the transmitter or the amplifier (216).

16. The optical communication fiber link (212) of example 15, wherein the transmitter comprises an analog transmitter.

The optical communication fiber link (212) of example 1, wherein the monitoring system (300) further includes a telemetry interface transmitting, via telemetry, at least one of the scattering, the (e.g., abnormal) change, or a signal (628) associated with the absence or the presence of a fault (304).

17. The optical communication fiber link (212) of example 1 coupled to a cable television network (CATV), wherein the communication comprises television signals used to view television.

18. A method for on-line monitoring of an optical communication fiber link (212), comprising:

detecting a scattering of electromagnetic radiation (904) from an optical fiber, the electromagnetic radiation (904) transmitting a communication;

monitoring the scattering for an (e.g., abnormal) change; and determining, from the (e.g., abnormal) change, an absence or a presence of a fault (304) in the optical fiber.

19. The method of example 19, wherein the monitoring comprises a computer (1502) or circuit determines the presence of absence of the fault (304) by comparing the scattering to reference data.

20. The method of example 19, further comprising determining, from the scattering, a temperature of the optical fiber.

21. The method or system of any of the examples, wherein the optical fiber is capable of transmitting electromagnetic radiation including a communication comprising video streaming, CATV signals, internet data, internet of things data, data for cloud applications, and/or electromagnetic radiation having a frequency of 1 Terahertz or more or a wavelength in a range of 400 nm to 300 micrometers.

CONCLUSION

This concludes the description of the preferred embodiments of the present disclosure. The foregoing description of the preferred embodiment has been presented for the purposes of illustration and description. It is not intended to be exhaustive or to limit the disclosure to the precise form disclosed. Many modifications and variations are possible in light of the above teaching. It is intended that the scope of rights be limited not by this detailed description, but rather by the claims appended hereto.

What is claimed is:

1. An optical communication fiber link, comprising:

a monitoring system connected to an optical fiber communicating a signal, the monitoring system:

detecting a scattering of the signal from the optical fiber and detecting reference data from the signal, each separately provided from the optical fiber to the monitoring system;

monitoring the scattering for a change using a comparison to the reference data; and determining, from the change, an absence or a presence of a fault in the optical fiber.

2. The optical communication fiber link of claim 1, wherein the monitoring system determines a temperature of the optical fiber from the scattering.

3. The optical communication fiber link of claim 1, wherein the monitoring system includes at least one of a circuit or a computer determining the absence or the presence of the fault by comparing the scattering to the reference data.

4. The optical communication fiber link of claim 3, wherein the reference data comprises at least one of:

an optical power of the signal transmitted by the optical fiber, or a measurement of a backscattered optical power as a function of a distance along the optical fiber.

5. The optical communication fiber link of claim 1, wherein the monitoring system detects the scattering comprising noise and the monitoring system includes a computer or circuit executing a Kalman filter estimating an actual value for the scattering from the noise.

6. The optical communication fiber link of claim 1, wherein:

the optical communication fiber link includes:

a transmitter;

an amplifier; and a receiver; wherein:

the optical fiber comprises a first segment transmitting the signal from the transmitter to the amplifier and a second segment transmitting the signal from the amplifier to the receiver, wherein the amplifier amplifies an intensity of the signal; and the monitoring system includes a photodetector positioned to detect the scattering comprising a backscattering of the signal from one or more predetermined locations in the second segment or the first segment.

7. The optical communication fiber link of claim 6, wherein the transmitter further comprises:

a laser outputting the signal; and a modulator modulating the laser such that the laser outputs the signal comprising a pilot signal and a communication distinct from the pilot signal, wherein the monitoring system detects the backscattering by demodulating the pilot signal from the backscattering.

8. The optical communication fiber link of claim 7, wherein the monitoring system further comprises:

a first photodetector positioned to detect the signal after an output from at least one of the transmitter or the amplifier and output a reference signal in response thereto;

the photodetector comprising a second photodetector positioned to detect the backscattering from the one or more predetermined locations and output a backscattering signal in response thereto;

a computer or circuit comparing the reference signal and the backscattering signal so as to determine the absence or the presence of the fault.

9. The optical communication fiber link of claim 7, wherein the monitoring system further comprises:

a first photodetector positioned to detect the signal after an output from at least one of the transmitter or the amplifier and output a reference signal in response thereto;

the photodetector comprising a second photodetector positioned to detect the backscattering from the one or more predetermined locations and output a backscattering signal in response thereto;

first circuitry determining, from the reference signal, at least one of a reference amplitude or a reference phase of the pilot signal in the reference signal;

second circuitry determining, from the backscattering signal, at least one of a backscattering amplitude or a backscattering phase of the pilot signal in the backscattering;

a computer or circuit determining the presence or absence of the fault using the reference phase, the reference amplitude, the backscattering phase, and the backscattering amplitude.

10. The optical communication fiber link of claim 9, wherein:

the pilot signal comprises a low frequency pilot tone;

the first circuitry comprises a first low pass filter extracting a first band of frequencies including the pilot tone, a first signal conditioner conditioning the first band of frequencies to form a first conditioned band of frequencies, and a de-modulator de-modulating the first conditioned band of frequencies to obtain the reference phase and the reference amplitude of the pilot signal; and the second circuitry comprises a second low pass filter extracting a second band of frequencies including the pilot tone, a second signal conditioner conditioning the second band of frequencies to form a second conditioned band of frequencies, and the de-modulator de-modulating the second conditioned band of frequencies to obtain the backscattering phase and backscattering amplitude of the pilot signal.

11. The optical communication fiber link of claim 10, wherein the first photodetector, the second photodetector, the first circuitry, and the second circuitry are integrated with the transmitter or the amplifier.

12. The optical communication fiber link of claim 10, wherein:

the backscattering phase and backscattering amplitude comprise noise, the computer or circuit executes a Kalman filter estimating, from the noise, actual values for the backscattering phase and the backscattering amplitude; and the computer or circuit estimates the presence or absence of the fault by comparing the actual values estimated by the Kalman filter with reference data.

13. The optical communication fiber link of claim 12, wherein:

the reference data comprises:

a backscattering optical power as a function of a distance along the optical fiber;

transmitted power of the signal; and the computer or circuit estimates a location of the fault as the distance associated with the actual value of the backscattering amplitude estimated by the Kalman filter taking into account the transmitted power of the signal.

14. The optical communication fiber link of claim 12, wherein the reference data includes a transmitted optical power of the signal and a distance to the fault is determined by correlating the actual value of the backscattering amplitude with the transmitted output power.

15. The optical communication fiber link of claim 14, further comprising a remote node including the monitoring system and at least one of the transmitter or the amplifier.

16. The optical communication fiber link of claim 15, wherein the transmitter comprises an analog transmitter.

17. The optical communication fiber link of claim 1, wherein the monitoring system further includes a telemetry interface transmitting, via telemetry, at least one of the scattering or a fault signal associated with the absence or the presence of a fault.

18. The optical communication fiber link of claim 1 coupled to a cable television network, wherein the signal comprises one or more television signals used to view television.

19. A method for on-line monitoring of an optical communication fiber link, comprising:

detecting a scattering of a signal and reference data in the signal from an optical fiber;

separating the scattering of the signal from the reference data; and determining an absence or a presence of a fault in the optical fiber based upon a comparison of the reference data to the scattering of the signal.

20. The method of claim 19, wherein the monitoring comprises a computer or circuit determines the presence of absence of the fault by comparing the scattering to the reference data.

21. The method of claim 19, further comprising determining, from the scattering, a temperature of the optical fiber.

* * * * *